United States Patent
Wang

(10) Patent No.: US 7,520,202 B2
(45) Date of Patent: Apr. 21, 2009

(54) GUIDING DEVICE FOR SAW BLADE OF BAND SAW

(75) Inventor: Jacky Wang, Taichung County (TW)

(73) Assignee: OAV Equipment & Tools, Inc., Taichung Hsien (TW)

( * ) Notice: Subject to any disclaimer, the term of this patent is extended or adjusted under 35 U.S.C. 154(b) by 303 days.

(21) Appl. No.: 11/594,911

(22) Filed: Nov. 9, 2006

(65) Prior Publication Data
US 2008/0110315 A1   May 15, 2008

(51) Int. Cl.
B27B 13/10 (2006.01)
(52) U.S. Cl. .......................................... 83/820; 83/826
(58) Field of Classification Search .................. 83/820, 83/826, 829, 824, 821
See application file for complete search history.

(56) References Cited

U.S. PATENT DOCUMENTS

| | | | | |
|---|---|---|---|---|
| 276,259 | A * | 4/1883 | McChesney | 83/820 |
| 353,530 | A * | 11/1886 | Black | 83/820 |
| 876,816 | A * | 1/1908 | Lippmann | 83/826 |
| 1,539,958 | A * | 6/1925 | Rush | 83/826 |
| 1,547,606 | A * | 7/1925 | Preston | 83/826 |
| 1,870,402 | A * | 8/1932 | Carter | 83/826 |
| 2,749,951 | A * | 6/1956 | Tetzner | 83/545 |
| 3,104,576 | A * | 9/1963 | Robinson | 83/169 |
| 3,220,446 | A * | 11/1965 | Burkey | 83/168 |
| 3,534,647 | A * | 10/1970 | Mills | 83/820 |
| 3,643,536 | A * | 2/1972 | Alexander | 83/820 |
| 4,179,966 | A * | 12/1979 | Ginnow et al. | 83/820 |
| 4,189,968 | A * | 2/1980 | Miranti, Jr. | 83/816 |
| 4,342,241 | A * | 8/1982 | Eklund | 83/56 |
| 4,920,846 | A * | 5/1990 | Duginske et al. | 83/820 |
| 4,981,062 | A * | 1/1991 | Raach | 83/820 |
| 5,415,069 | A * | 5/1995 | Collins et al. | 83/824 |
| 6,202,528 | B1 * | 3/2001 | Morgan | 83/824 |
| 6,412,380 | B2 * | 7/2002 | Belfiglio | 83/168 |
| 6,889,589 | B1 * | 5/2005 | Belfiglio | 83/824 |
| 6,986,300 | B2 * | 1/2006 | Belfiglio | 83/168 |
| 7,077,041 | B2 * | 7/2006 | Kunkel et al. | 83/34 |
| 7,325,473 | B2 * | 2/2008 | Belfiglio | 83/824 |
| 2001/0002568 | A1 * | 6/2001 | Belfiglio | 83/820 |
| 2002/0023527 | A1 * | 2/2002 | Wood | 83/821 |
| 2002/0121171 | A1 * | 9/2002 | Falberg | 83/820 |
| 2004/0103773 | A1 * | 6/2004 | Helshoj | 83/820 |
| 2005/0109184 | A1 * | 5/2005 | Belfiglio | 83/820 |
| 2008/0110315 | A1 * | 5/2008 | Wang | 83/829 |
| 2008/0173151 | A1 * | 7/2008 | Belfiglio | 83/820 |

* cited by examiner

*Primary Examiner*—Kenneth E. Peterson
*Assistant Examiner*—Sean Michalski
(74) *Attorney, Agent, or Firm*—Browdy and Neimark P.L.L.C.

(57) ABSTRACT

A guiding device for guiding movement of a saw blade of a band saw includes a holder base and two saw blade guiding units. The holder base includes a base portion for mounting to the band saw, and two parallel supporting arms. Each of the saw blade guiding units has a sleeve fastened to a transversely extending through hole of one of the supporting arms, a ball rotatably received in the sleeve, and a wheel having a metal wheel shaft with one end inserted into the sleeve and stopped at the ball, and a wheel body made of ceramic material and connected to the other end of the wheel shaft for stopping against one lateral side of the saw blade.

6 Claims, 4 Drawing Sheets

GUIDING DEVICE FOR SAW BLADE OF BAND SAW

BACKGROUND OF THE INVENTION

1. Field of the Invention

The present invention relates to a band saw and more specifically, to a device for guiding a saw blade of the band saw.

2. Description of the Related Art

A conventional band saw generally uses a saw blade guiding device to guide movement of the saw blade. FIG. 1 shows a saw blade guiding device 70 according to the prior art. According to this design, the saw blade guiding device 70 comprises a mounting base 71 affixed to a lifting mechanism of a band saw (not shown), a saw blade urging unit 72 provided at the front side of the mounting base 71 near the top, and a saw blade guiding unit 73 provided at the front side of the mounting base 71 near the bottom. The saw blade urging unit 72 comprises a shaft 722 fixedly connected to the mounting base 71, and a roller 724 rotatably supported on the shaft 722 and disposed in contact with the back side of the saw blade 74 opposite to the cutting teeth of the saw blade 74. The saw blade guiding unit 73 comprises a wheel holder 731 affixed to the mounting base 72, two screw bolts 732 fastened to the wheel holder 731 and arranged in parallel, and two rollers 733 respectively rotatably supported on the screw bolts 732 and disposed in contact with the two opposite lateral sides of the saw blade 74.

The aforesaid conventional saw blade guiding device 70 is still not satisfactory in function because of the following drawbacks:

1. The rollers 724 and 733 are directly contacted with the saw blade 74. When the saw blade 74 is driven to move by the motor (not shown), a friction is produced between the saw blade 74 and the rollers 724 and 733. Because the rollers 724 and 733 are metal members, the surfaces of the rollers 724 and 733 might wear out quickly with the use of the metal rollers 724 and 733. Further, during friction contact between the saw blade 74 and the metal rollers 724 and 733, noise in high level will be produced.

2. When the surfaces of the rollers 724 and 733 start to wear, the rollers 724 and 733 will be unable to prohibit the saw blade 74 from biasing during cutting working, thereby resulting in a poor cutting quality.

SUMMARY OF THE INVENTION

The present invention has been accomplished under the circumstances in view. It is therefore one objective of the present invention to provide a guiding device for a saw blade of a band saw, which is durable in use and, does not cause much noise during operation of the band saw.

It is another objective of the present invention to provide a guiding device for a saw blade of a band saw, which prohibits biasing of the saw blade during the operation of the band saw, thereby improving the cutting quality.

To achieve these objectives of the present invention, the saw blade guiding device is used for installation in a band saw for guiding movement of a saw blade of the band saw. The guiding device comprises a holder base and two saw blade guiding units. The holder base has a base portion for mounting to a part of the band saw and two supporting arms extending parallel from two sides of the base portion. The supporting arms each have a transversely extending through hole. The two saw blade guiding units are respectively mounted on the supporting arms of the holder base for stopping against two opposite lateral sides of the saw blade to guide movement of the saw blade. Each saw blade guiding unit comprises a sleeve respectively fastened to the transversely extending through holes of the supporting arms and provided with an axial hole, a ball rotatably received in the axial hole of the sleeve, and a wheel, which has a metal wheel shaft with one end thereof inserted into the axial hole of the sleeve and stopped at the ball, and a wheel body made of ceramic material and connected to the other end of the wheel shaft for stopping against one lateral side of the saw blade.

In a preferred embodiment of the present invention, the saw blade guiding device further comprises a saw blade urging unit mounted on the base portion of the holder base for stopping against a back side of the saw blade. The saw blade urging unit has a rod member fastened to a through hole of the base portion of the holder base, and a bearing rotatably supported on the rod member for stopping against the back side of the saw blade. Further, the wheel shaft of each of the saw blade guiding units is provided at the one end thereof with a rounded recess fitting the ball that is in contact with the one end of the wheel shaft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
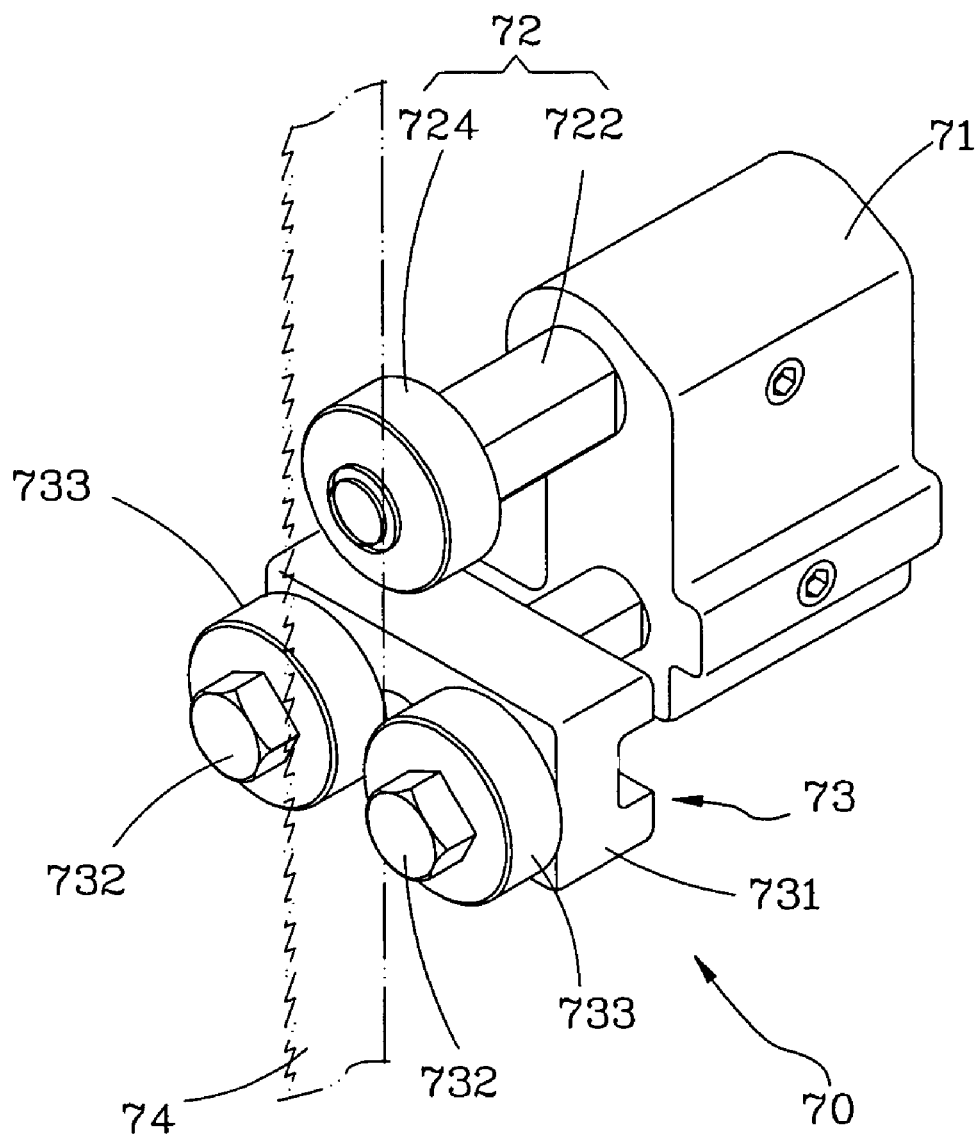
FIG. 1 is a perspective assembly view of a saw blade guiding device according to the prior art.
Figure 2:
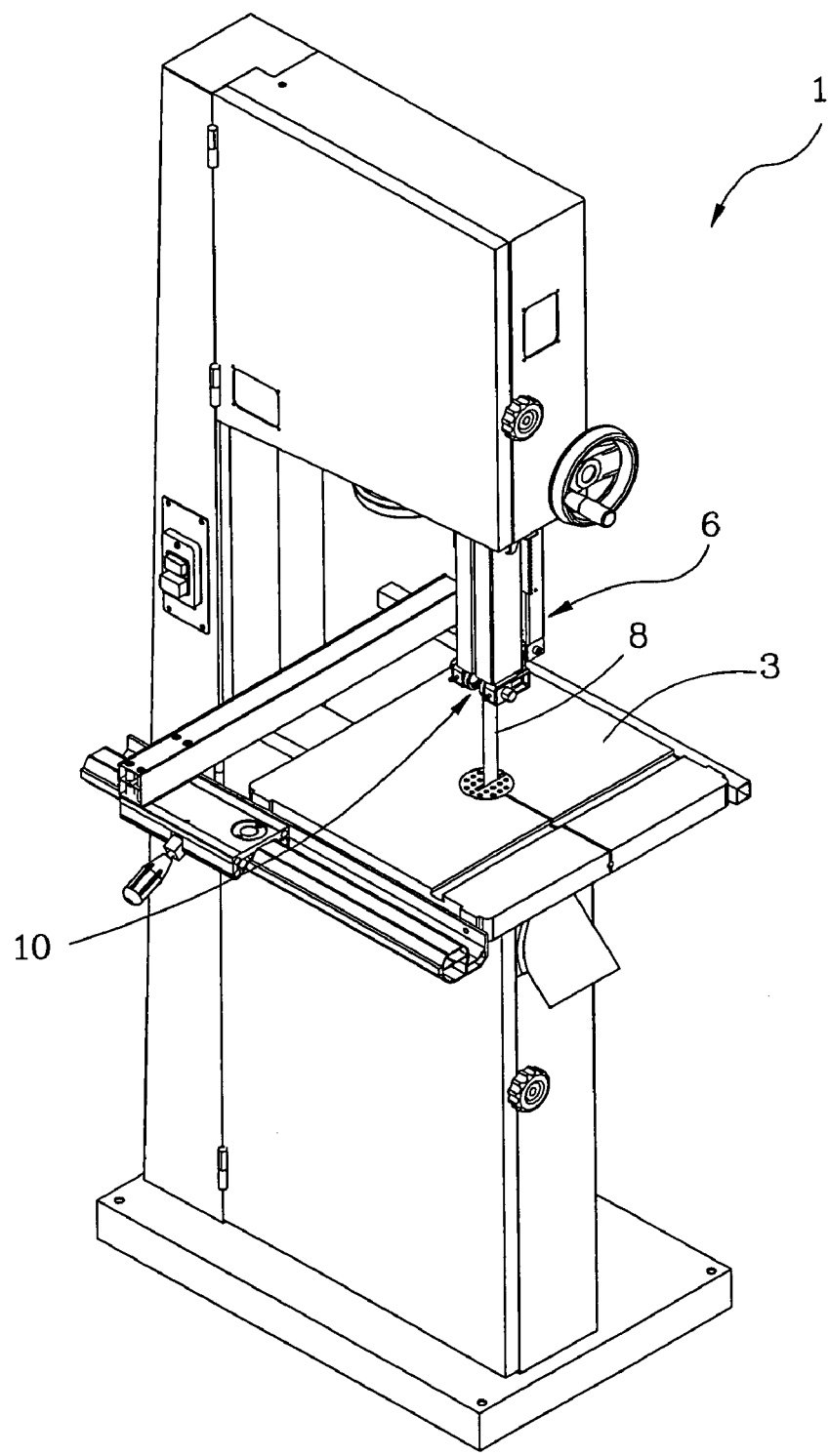
FIG. 2 is a perspective view of a band saw using a saw blade guiding device according to a preferred embodiment of the present invention.
Figure 3:
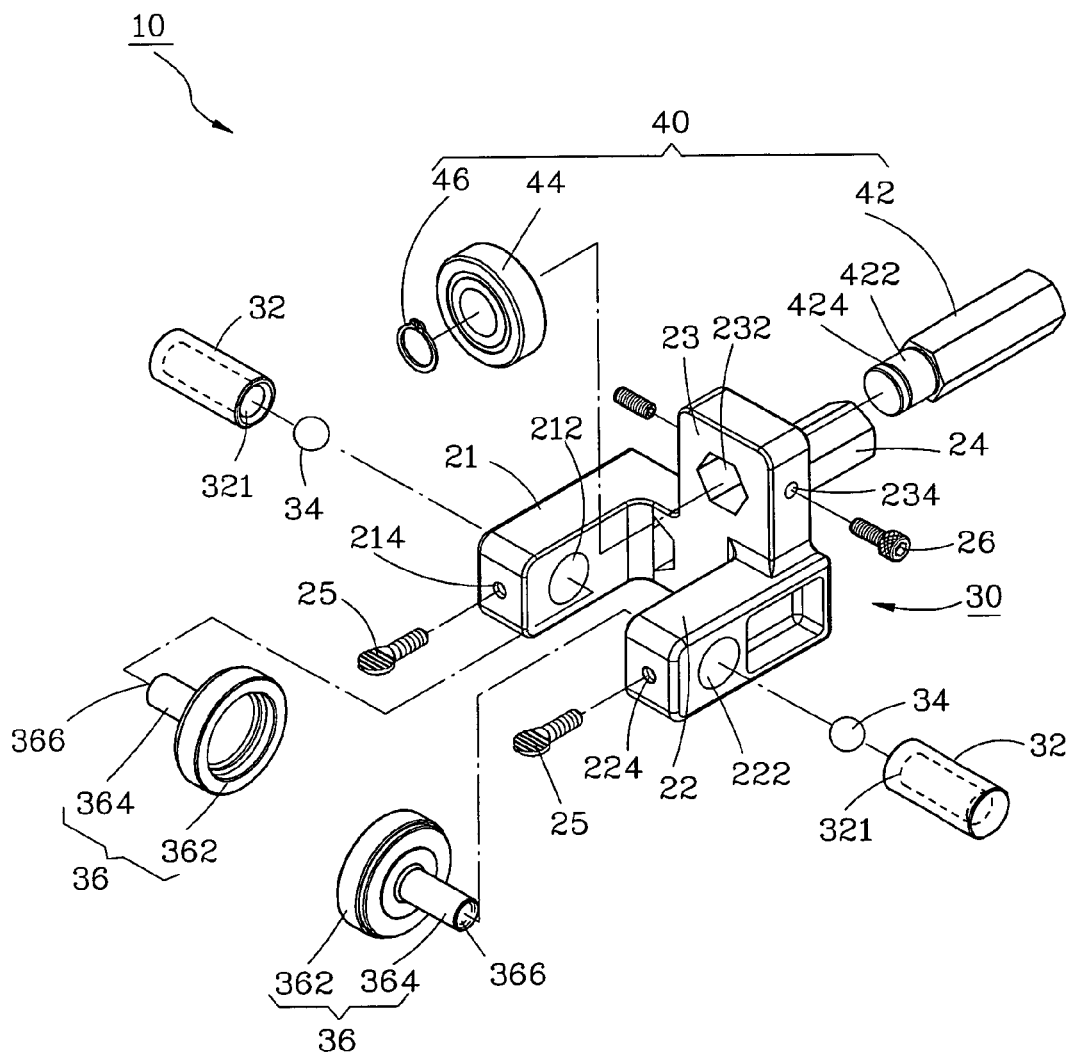
FIG. 3 is an exploded view of the saw blade guiding device according to the preferred embodiment of the present invention.
Figure 4:
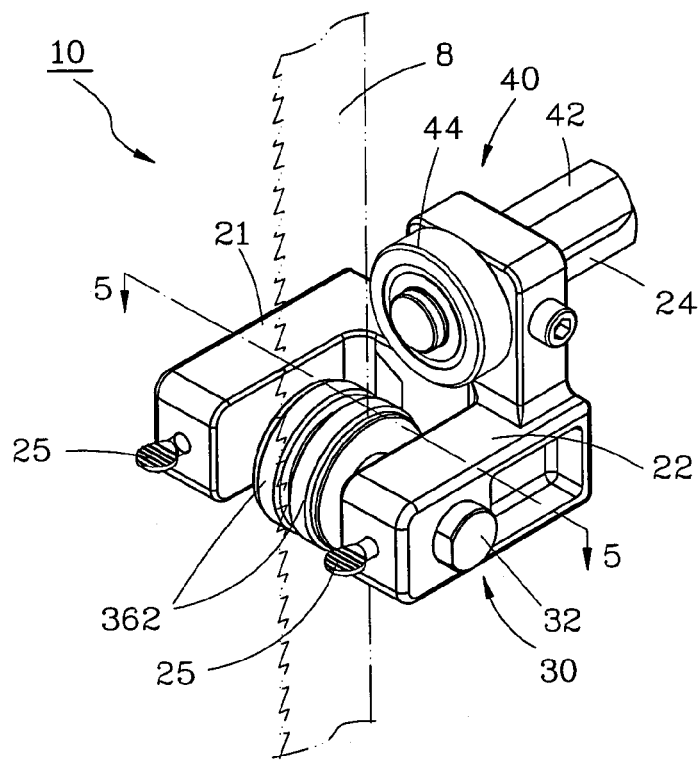
FIG. 4 is a perspective assembly view of the saw blade guiding device according to the preferred embodiment of the present invention.

As shown in FIGS. 2 and 3, a saw blade guiding device 10 is used for installation in a band saw 1 above a table 3 for guiding movement of a saw blade 8. The saw blade guiding device 10 comprises a holder base 20, two saw blade guiding units 30, and a saw blade urging unit 40.

The holder base 20 is a substantially U-shaped block having a vertically extending base portion 23, two horizontal supporting arms 21 and 22 extending from two opposite lateral sides of the base portion 23 and arranged in parallel, and a horizontal mounting rod 24 perpendicularly backwardly extending from the back side of the vertically extending base portion 23 in reversed direction relative to the supporting arms 21 and 22 for fastening to a lifting mechanism 6 of the band saw 1. The supporting arms 21 and 22 each have a transverse through hole 212 or 222 and a front screw hole 214 or 224 in communication with the respective through hole 212 or 222. Two screw bolts 25 are respectively partially threaded into the front screw holes 214 and 224 of the supporting arms 21 and 22 of the holder base 20. The base portion 23 has a horizontal hexagonal through hole 232 cut through the front and back sides of the base portion 23, and a transverse screw hole 234 extending across the hexagonal through hole 232. A screw bolt 26 is threaded into the transverse screw hole 234 from one side and partially projecting into the hexagonal through hole 232.

Figure 5:
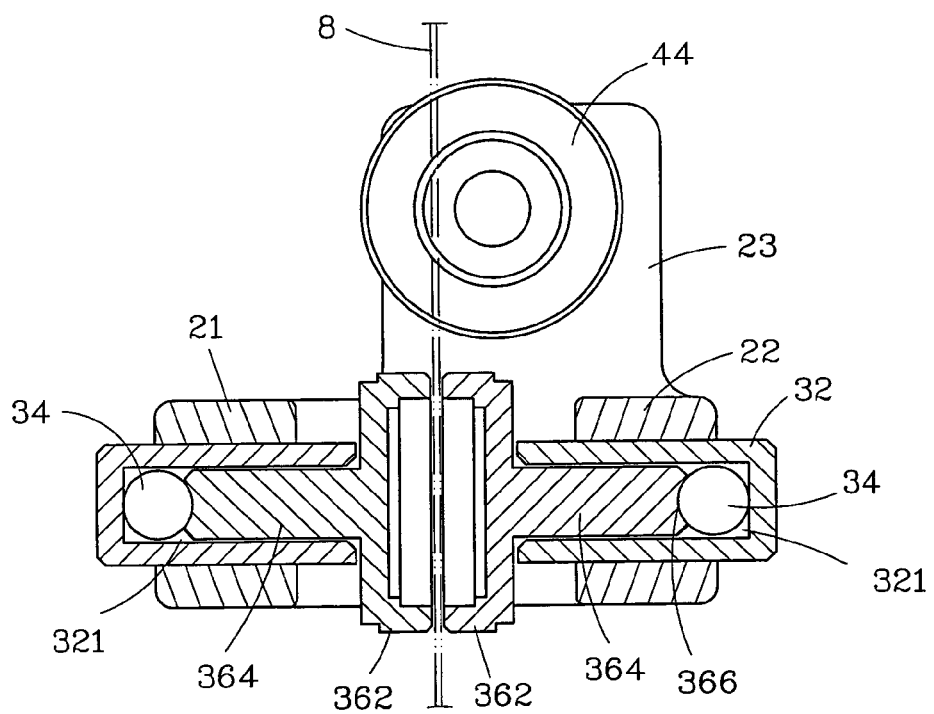
FIG. 5 is a sectional view taken along line 5-5 of FIG. 4.

The two saw blade guiding units 30 are respectively supported on the supporting arms 21 and 22, each comprising a sleeve 32, a ball 34, and a wheel 36. The sleeves 32 of the saw blade guiding units 30 are tubular members having a single open end respectively mounted in the transverse through holes 212 and 222 of the supporting arms 21 and 22 of the holder base 20, and then held down in position by the screw bolts 25. The sleeves 32 each have an axial hole 321 extending to one end for accommodating the associating ball 34 respectively. The wheel 36 comprises a wheel body 362 made of ceramics for stopping against one of the two opposite lateral sides of the saw blade 8, and a metal wheel shaft 364 perpendicularly extending from the center of one side of the wheel body 362 and inserted into the axial hole 321 of the associating sleeve 32. The metal wheel shaft 364 has an end recess 366 fitting the periphery of the associating ball 34. When installed, the wheel 36 is rotatable relative to the associating sleeve 32 (see FIG. 5).

The saw blade urging unit 40 is supported on the vertically extending base portion 23 of the holder base 20, comprising a hexagonal rod 42 and a bearing 44. The hexagonal rod 42 is fitted into the hexagonal through hole 232 of the base portion 23 of the holder base 20 and held down in position by the screw bolt 26, having a front extension 422 shaped like a round rod and a locating groove 424 extending around the periphery of the front extension 422. The bearing 44 is mounted on the front extension 422. Further, a C-shaped retainer 46 is fastened to the locating groove 424 to secure the bearing 44 in place, allowing rotation of the bearing 44 relative to the hexagonal rod 42. When installed, the outer side of the bearing 44 is stopped against the back side of the saw blade 8.

According to the present invention, the wheels 36 of the saw blade guiding units 30 are respectively disposed in contact with the two opposite lateral sides of the saw blade 8. Therefore, during cutting working of the saw blade 8 of the band saw 1, the wheel bodies 362 of the wheels 36 support and guide movement of the saw blade 8 positively in course, and the downward movement of the saw blade 8 will drive the wheels 36 to rotate. Because the saw blade guiding device 10 of the present invention prohibits the saw blade 8 from biasing during cutting working, the workpiece cutting precision is greatly improved and, the saw blade 8 will not easily break. Further, because the wheel body 362 of the wheel 36 is made of ceramics, the wheel 36 does not wear quickly when in use, and the noise level that is produced during cutting working of the saw blade 8 is low.

Further, the pitch between the wheel bodies 362 of the wheels 36 of the saw blade guiding units 30 can be properly adjusted subject to the thickness of the saw blade 8. When adjusting the pitch, loosen the screw bolts 25, and then move the sleeves 32 axially in the transverse through holes 222 relative to the supporting arms 22 to the desired position, and the fasten up the screw bolts 25 to fix the sleeves 32 in the adjusted position. As indicated, the adjustment of the pitch between the wheel bodies 362 of the wheels 36 is quite simple.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A guiding device for guiding movement of a saw blade of a band saw, the guiding device comprising:
a holder base having a base portion for mounting to a part of the band saw, and two supporting arms parallel extending from the base portion, the supporting arms each having a through hole defined by an axis which is normal to both lateral sides of a saw blade guide by said guiding device and
two saw blade guiding units each having a sleeve respectively fastened to the through holes of the supporting arms and provided with an axial hole, a ball rotatably received in the axial hole of the sleeve, and a wheel having a metal wheel shaft with one end inserted into the axial hole of the sleeve and stopped at the ball, and a wheel body made of ceramic material and connected to the other end of the wheel shaft for stopping against one lateral side of the saw blade.

2. The guiding device as claimed in claim 1, further comprising a saw blade urging unit mounted on the base portion of the holder base for stopping against a back side of the saw blade.

3. The guiding device as claimed in claim 2, wherein the base portion of the holder base has a through hole and the saw blade urging unit comprises a rod member fastened to the through hole of the base portion of the holder base, and a bearing rotatably supported on the rod member for stopping against the back side of the saw blade.

4. The guiding device as claimed in claim 3, wherein the base portion of the holder base has a screw hole in communication with the through hole of the base portion and a screw bolt threaded into the screw hole and stopped against the rod member of the saw blade urging unit for holding the rod member in position.

5. The guiding device as claimed in claim 1, wherein the supporting arms each have a screw hole perpendicularly extending from the transversely extending through hole to a front side thereof, and a screw bolt threaded into the screw hole and stopped against the sleeve for holding the sleeve in position.

6. The guiding device as claimed in claim 1, wherein the wheel shaft of each of the saw blade guiding units is provided at the one end thereof with a recess fitting the ball that is in contact with the one end of the wheel shaft.

* * * * *